(12) United States Patent
Li

(10) Patent No.: US 12,432,028 B2
(45) Date of Patent: Sep. 30, 2025

(54) POSITIONING METHOD, COMMUNICATION DEVICE, AND STORAGE MEDIUM

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 395 days.

(21) Appl. No.: 18/012,912

(22) PCT Filed: Jul. 7, 2020

(86) PCT No.: PCT/CN2020/100674
§ 371 (c)(1),
(2) Date: Dec. 23, 2022

(87) PCT Pub. No.: WO2022/006744
PCT Pub. Date: Jan. 13, 2022

(65) Prior Publication Data
US 2023/0300890 A1    Sep. 21, 2023

(51) Int. Cl.
*H04L 5/00* (2006.01)
*H04W 64/00* (2009.01)
*H04W 74/0833* (2024.01)

(52) U.S. Cl.
CPC ......... *H04L 5/0048* (2013.01); *H04W 64/003* (2013.01); *H04W 74/0833* (2013.01)

(58) Field of Classification Search
None
See application file for complete search history.

(56) References Cited

U.S. PATENT DOCUMENTS

| | | |
|---|---|---|
| 9,088,954 B2 | 7/2015 | Choi et al. |
| 10,595,345 B2 | 3/2020 | Gu et al. |
| 10,736,147 B2 | 8/2020 | Jung et al. |

(Continued)

FOREIGN PATENT DOCUMENTS

| | | |
|---|---|---|
| CN | 101883423 A | 11/2010 |
| CN | 102474845 A | 5/2012 |

(Continued)

OTHER PUBLICATIONS

The extended European search report of application No. 20944018.9 dated on Feb. 9, 2024.(14P).

(Continued)

*Primary Examiner* — Melvin H Pollack
(74) *Attorney, Agent, or Firm* — Arch & Lake LLP

(57) ABSTRACT

A positioning method applied to a terminal device is provided. The method includes: receiving a plurality of synchronization signal blocks sent by a network device; dividing the plurality of synchronization signal blocks into M synchronization signal block groups, where M is a positive integer; sending, for each of the synchronization signal block groups, random access preambles corresponding to N synchronization signal blocks on random access resources corresponding to the N synchronization signal blocks belonging to the same synchronization signal block group, where the random access preambles is configured for positioning, and N is a positive integer.

18 Claims, 6 Drawing Sheets

(56) References Cited

U.S. PATENT DOCUMENTS

| | | | |
|---|---|---|---|
| 10,750,460 B2* | 8/2020 | Huang | H04L 5/0007 |
| 11,399,356 B2* | 7/2022 | Akkarakaran | H04W 64/00 |
| 11,558,162 B2* | 1/2023 | Manolakos | H04L 5/0053 |
| 11,576,060 B2* | 2/2023 | Manolakos | H04W 24/08 |
| 11,758,490 B2* | 9/2023 | Liu | H04W 72/0453 370/329 |
| 11,792,766 B2* | 10/2023 | Ren | H04W 64/006 455/456.1 |
| 11,808,871 B2* | 11/2023 | Manolakos | H04W 72/23 |
| 11,943,816 B2* | 3/2024 | Dallal | H04W 74/0833 |
| 11,963,048 B2* | 4/2024 | Yao | H04W 36/0094 |
| 11,979,845 B2* | 5/2024 | Cha | H04L 5/0048 |
| 12,004,095 B2* | 6/2024 | Jia | H04L 5/0094 |
| 12,022,522 B2* | 6/2024 | Lee | H04L 5/00 |
| 12,069,500 B2* | 8/2024 | Cheng | H04W 56/001 |
| 12,069,658 B2* | 8/2024 | Takano | H04W 72/02 |
| 12,095,691 B2* | 9/2024 | Cha | H04W 56/0005 |
| 12,096,384 B2* | 9/2024 | Harada | H04L 5/0053 |
| 12,108,349 B2* | 10/2024 | Cha | H04L 5/0023 |
| 12,108,400 B2* | 10/2024 | Back | H04W 72/20 |
| 12,120,669 B2* | 10/2024 | Jung | H04W 24/10 |
| 12,133,214 B2* | 10/2024 | Park | H04W 74/0841 |
| 12,133,262 B2* | 10/2024 | Takano | H04W 74/0833 |
| 12,150,117 B2* | 11/2024 | Liu | H04W 72/23 |
| 12,155,602 B2* | 11/2024 | Cha | H04L 5/0051 |
| 12,156,167 B2* | 11/2024 | Wu | G01S 5/0236 |
| 12,167,254 B2* | 12/2024 | Karjalainen | H04W 16/28 |
| 12,167,375 B2* | 12/2024 | Cha | G01S 5/06 |
| 12,192,963 B2* | 1/2025 | Khoryaev | H04W 72/0446 |
| 12,199,899 B2* | 1/2025 | Michalopoulos | H04W 24/10 |
| 12,200,659 B2* | 1/2025 | Yoon | H04L 5/0051 |
| 12,206,487 B2* | 1/2025 | Hu | H04W 56/0045 |
| 12,207,209 B2* | 1/2025 | Harada | H04W 56/001 |
| 12,207,307 B2* | 1/2025 | Bai | H04W 56/0015 |
| 12,213,088 B2* | 1/2025 | Kurita | H04L 5/0023 |
| 12,250,649 B2* | 3/2025 | Harada | H04W 36/0007 |
| 12,256,276 B2* | 3/2025 | Zhu | H04W 36/0085 |
| 2012/0157117 A1 | 6/2012 | Choi et al. | |
| 2013/0028204 A1 | 1/2013 | Dinan | |
| 2018/0279380 A1 | 9/2018 | Jung et al. | |
| 2018/0368186 A1 | 12/2018 | Gu et al. | |
| 2019/0110314 A1 | 4/2019 | Abedini et al. | |
| 2019/0159261 A1* | 5/2019 | Jung | H04W 72/542 |
| 2020/0337091 A1 | 10/2020 | Jung et al. | |
| 2021/0058879 A1* | 2/2021 | Geng | H04W 56/001 |
| 2023/0209495 A1* | 6/2023 | Michalopoulos | H04W 64/00 455/456.2 |
| 2024/0022933 A1* | 1/2024 | Jiang | H04W 24/08 |
| 2024/0049287 A1* | 2/2024 | Lee | H04W 74/004 |

FOREIGN PATENT DOCUMENTS

| | | | | |
|---|---|---|---|---|
| CN | 109041250 A | 12/2018 | | |
| CN | 109151905 A | 1/2019 | | |
| CN | 110381578 A | 10/2019 | | |
| CN | 110463332 A | 11/2019 | | |
| CN | 111183684 A | 5/2020 | | |
| CN | 111294787 A | 6/2020 | | |
| CN | 110741716 B * | 3/2024 | | H04L 5/005 |
| WO | 2019075041 A1 | 4/2019 | | |
| WO | 2020010548 A1 | 1/2020 | | |
| WO | WO-2020041089 A1 * | 2/2020 | | H04W 56/0005 |
| WO | 2020088219 A1 | 5/2020 | | |
| WO | WO-2021087821 A1 * | 5/2021 | | G01S 5/0036 |

OTHER PUBLICATIONS

CNOA of Application No. 202080001501.5 dated on Dec. 2, 2022 with English translation,(12p).
International Search Report of PCT/CN2020/100674 dated Mar. 26, 2021, with English translation, (4p).

* cited by examiner

POSITIONING METHOD, COMMUNICATION DEVICE, AND STORAGE MEDIUM

CROSS-REFERENCE TO RELATED APPLICATION

This application is the U.S. national phase of International Application No. PCT/CN2020/100674 filed on Jul. 7, 2020, the entire content of which is incorporated herein by reference for all purposes.

TECHNICAL FIELD

The present disclosure relates to the technical field of communication, and in particular to a positioning method, a communication device and a storage medium.

BACKGROUND

In order to clarify its own location, a terminal device has requirement for positioning.

SUMMARY

According to a first aspect of the present disclosure, a positioning method is provided, which includes:
receiving a plurality of synchronization signal blocks sent by a network device;
dividing the plurality of synchronization signal blocks into M synchronization signal block groups, in which M is a positive integer; and
sending, for each of the synchronization signal block groups, random access preambles corresponding to N synchronization signal blocks on random access resources corresponding to the N synchronization signal blocks belonging to the same synchronization signal block group, where the random access preambles is configured for positioning, and N is a positive integer.

According to a second aspect of the present disclosure, a positioning method is provided, which includes:
sending a plurality of synchronization signal blocks to a terminal device, in which the plurality of synchronization signal blocks are divided by the terminal device into M synchronization signal block groups, in which M is a positive integer; and
receiving, for each of the synchronization signal block groups, random access preambles corresponding to N synchronization signal blocks on random access resources corresponding to the N synchronization signal blocks belonging to the same synchronization signal block group, where the random access preambles is configured for positioning, and N is a positive integer.

According to a third aspect of the present disclosure, a terminal device is provided, and the terminal device includes: a processor; a transceiver connected to the processor; a memory for storing executable instructions of the processor; in which the processor is configured to load and execute the executable instructions to implement the positioning methods as described in the first aspect.

According to a fourth aspect of the present disclosure, a network device is provided, and the network device includes: a processor; a transceiver connected to the processor; a memory for storing executable instructions of the processor; in which the processor is configured to load and execute the executable instructions to implement the positioning methods as described in the second aspect.

According to a fifth aspect of the present disclosure, a non-transitory computer-readable storage medium is provided, in which executable instructions are stored in the readable storage medium, and the executable instructions are loaded and executed by the processor to implement the positioning methods as described in the above aspects.

BRIEF DESCRIPTION OF THE DRAWINGS

In order to more clearly illustrate the technical solutions in the embodiments of the present disclosure, the following will briefly introduce the drawings that need to be used in the description of the embodiments. Apparently, the drawings in the following description are only some embodiments of the present disclosure, and those skilled in the art can obtain other drawings according to these drawings without any creative effort.

DETAILED DESCRIPTION

In order to make the purposes, technical solutions and advantages of the present disclosure clearer, implementations of the present disclosure will be further described in detail below in conjunction with the accompanying drawings.

First of all, the terms involved in the present application will be explained:

Synchronization Signal Block (SSB): It is a signal structure defined in the communication standard, which includes the Primary Synchronization Signal (PSS), the Secondary Synchronization Signal (SSS) and the Physical Broadcast Channel (PBCH).

Figure 1:
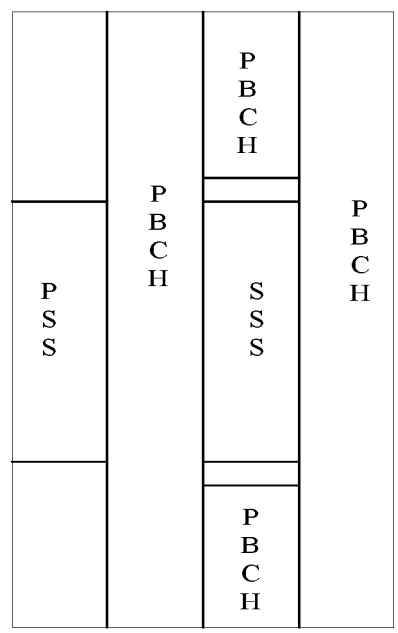
FIG. 1 is a schematic diagram of a time-frequency structure of a synchronization signal block provided by an embodiment of the present disclosure.

A Synchronization Signal Block is a group of resources (resource units) transmitted on a basic Orthogonal Frequency Division Multiplexing (OFDM) grid. In some embodiments, the group of resources is at least one of the following: time domain resources, frequency domain resources, code domain resources, time domain resources and frequency domain resources. FIG. 1 shows the time domain and frequency domain structure of a synchronization signal block. As shown in FIG. 1, the synchronization signal block lasts for 4 OFDM symbols in the time domain.

The subcarrier spacing of the synchronization signal block may be 15 KHz, 30 KHz, 120 KHz and 240 KHz. All synchronization signal blocks are sent within 5 ms time. In order to support beam transmission, when there are beams, each beam needs to send SSB, so the maximum number of synchronization signal blocks that can be sent within 5 ms is 4 (when the carrier frequency is below 3 GHz) or 8 (when the carrier frequency is 3 GHz-6 GHz) Or 64 (when the carrier frequency is above 6 GHz).

When a terminal device and a network device perform initial synchronization, the terminal device detects one of the synchronization signal blocks sent by the network device, obtains the synchronization signal block index (SSB index) of the synchronization signal block, and thus knows the symbol position, where the synchronization signal block is located, so the terminal device and the network device realize the symbol synchronization of the downlink. And in order to achieve uplink synchronization, the terminal device needs to send a random access preamble, and how to choose this random access preamble, and on which random access opportunity (Random access channel Occasion, RO) this random access preamble is sent is determined according to this synchronization signal block received by the terminal device and which synchronization signal blocks the network device actually transmits and the position sets of the RO. The specific process is as follows:

Step 1: The terminal device detects that the SSB index of this synchronization signal block received by itself is SSB #1.

Step 2: The terminal device receives message of a system information block 1 (System Information Block 1, SIB1) sent by the network device, which indicates which synchronization signal blocks are actually sent by the network device.

The network device uses two 8 bits to indicate which synchronization signal blocks are actually sent. Because the maximum transmittable position of the synchronization signal block is 64, the 64 synchronization signal blocks are divided into 8 groups, and the positions of the 8 synchronization signal blocks in each group are continuous. That is, SSB #0~#7 is the first group, SSB #8~15 is the second group . . . SSB #56~#63 is the eighth group. Then in the two 8 bits, the first 8 bits indicate which groups have synchronous signal blocks to send, for example, the first 8 bits are 00000001 (the left is high bits and the right is low bits), which means that only the first group has synchronous signal blocks to send. And then the second 8 bits indicate the synchronization signal blocks at which positions are sent in these groups that have synchronization signal blocks to send. For example, the second 8 bits are 10011011, which means that SSB #0, #1, #3, #4, #7 are sent in the first group.

Step 3: Through the Step 1 and the Step 2, the terminal device knows that this SSB #1 it receives is the second of the 5 synchronization signal blocks sent by the network device.

Step 4: The terminal device receives the SIB1 sent by the network device, and obtains SSB-perRACH-Occasion information, which identifies how many actually transmitted synchronization signal blocks the preamble in one RO needs to be allocated to.

The value of SSB-perRACH-Occasion is {⅛, ¼, ½, 1, 2, 4, 8, 16}. When this parameter is ⅛, it means that the SSB occupies 8 consecutive ROs. And when this parameter is 8, it means that 8 consecutive SSBs actually sent share this RO, but use different preambles, for example, 64 preambles are divided into 8 consecutive groups, and each synchronization signal block corresponds to one group of the preambles.

Figure 2:
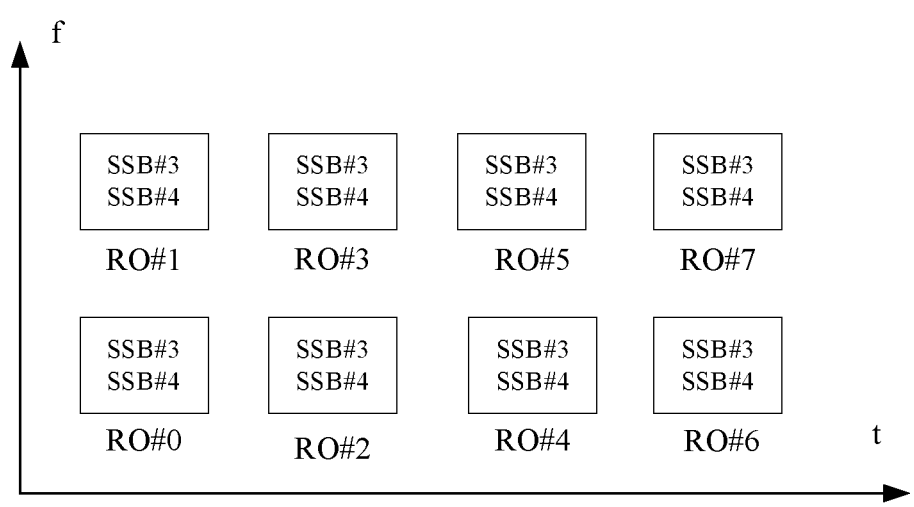
FIG. 2 is a schematic diagram of a random access opportunity provided by an embodiment of the present disclosure.

At the same time, the terminal device receives the SIB1 sent by the network device, and obtains the value of the number of ROs for Frequency-Division Multiplexing (FDM), which may be one of {1,2,4,8}. Exemplarily, if the value is 2, it means that there are two ROs in different frequency domains at the same time. And the number of RO is the frequency domain first and then the time domain. For example, when the SSB-perRACH-Occasion is 2 and the value of the number of the ROs of the FDM is 2, the ROs corresponding to the synchronization signal blocks are as shown in FIG. 2.

Figure 3:
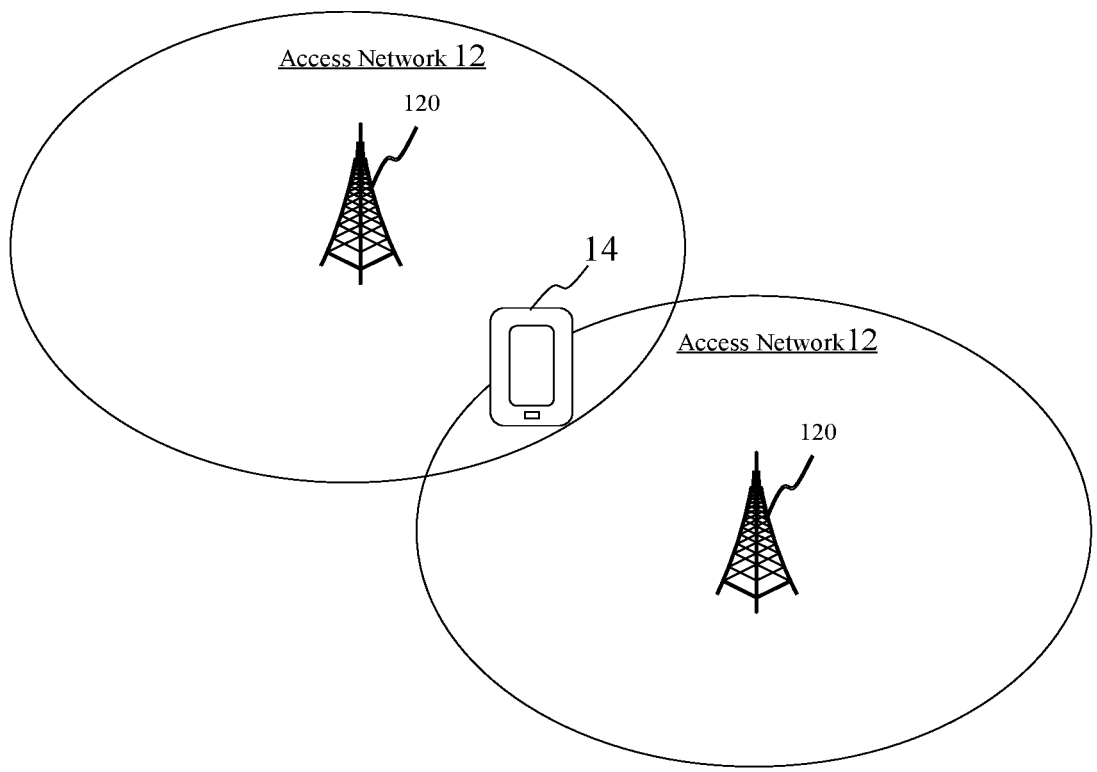
FIG. 3 is a block diagram of a communication system provided by an embodiment of the present disclosure.

FIG. 3 shows a block diagram of a communication system provided by an embodiment of the present disclosure. The communication system may include: an access network 12 and a terminal device 14.

The access network 12 includes several network devices 120. The network device 120 may be a base station, and the base station is an apparatus deployed in an access network to provide a terminal device with a wireless communication function. The base station may include various forms of macro base stations, micro base stations, relay stations, access points, and so on. In systems using different wireless access technologies, the names of devices with base station functions may be different. For example, in LTE systems, they are referred to as eNodeB or eNB; in 5G NR systems, they are referred to as gNodeB or gNB. As communications technology evolves, the description "base station" may change. For the convenience of description in the embodiments of the present disclosure, the above devices that provide the wireless communication function for the terminal device 14 are collectively referred to as network devices.

The terminal device 14 may include various handheld devices, vehicle-mounted devices, wearable devices, computing devices, or Internet of Things (IoT) devices or Industry Internet of Things (IIoT) devices or other processing devices connected to wireless modems, which have wireless communication functions, and various forms of user devices, Mobile Stations (MS), terminals (terminal devices), and so on. For convenience of description, the devices mentioned above are collectively referred to as terminal devices. The network device 120 and the terminal device 14 communicate with each other through a certain air interface technology, such as a Uu interface.

The technical solutions of the embodiments of the present disclosure can be applied to various communication systems, for example: Global System of Mobile Communication (GSM) system, Code Division Multiple Access (CDMA) system, Wideband Code Division Multiple Access (WCDMA) system, General Group Radio Service (GPRS), Long Term Evolution (LTE) system, LTE Frequency Division Duplex (FDD) system, LTE Time Division Duplex (TDD) system, Advanced Long Term Evolution (LTE-A) system, New Radio (NR) system, evolution system of NR system, LTE on unlicensed frequency band (LTE-based access to Unlicensed spectrum, LTE-U) system, NR-U system, Universal Mobile Telecommunication System (UMTS), Worldwide Interoperability for Microwave Access (WiMAX) communication system, Wireless Local Area Networks (WLAN), Wireless Fidelity (WiFi), next-generation communication systems or other communication systems, and so on.

Generally speaking, the number of connections supported by traditional communication systems is limited and easy to implement. However, with the development of communication technology, the mobile communication system will not only support traditional communication, but also support, for example, Device to Device (D2D) communication, Machine to Machine (M2M) communication, Machine Type Communication (MTC), Vehicle to Vehicle (V2V) communication and Vehicle to Everything (V2X) system, and so on. The embodiments of the present disclosure can also be applied to these communication systems.

Figure 4:
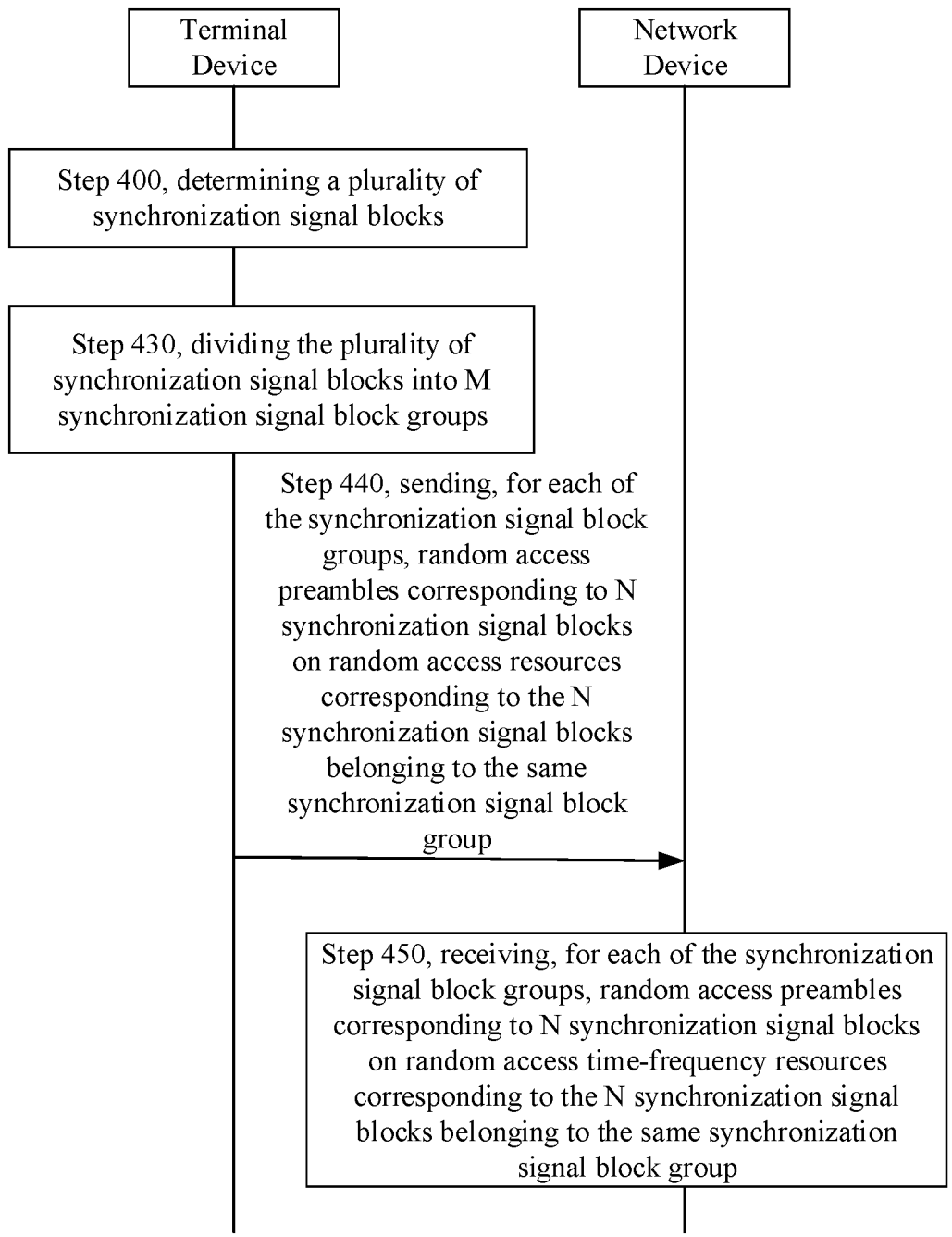
FIG. 4 is a flowchart of a positioning method provided by an embodiment of the present disclosure.

FIG. 4 shows a flowchart of a positioning method provided by an embodiment of the present disclosure, which can be applied to the terminal device and the network device shown in FIG. 3. The method includes:

A step 400, in which a plurality of synchronization signal blocks may be determined by the terminal device.

In an embodiment of the present disclosure, there may be many ways for the terminal device to determine a plurality of synchronization signal blocks, for example:

The plurality of synchronization signal blocks may be determined according to the provisions of the communication protocol, the configurations of the network side devices, and the synchronization signal blocks sent by the network side devices.

In the following embodiment of the present disclosure, the following way will be used as an example for illustration, that is, in the following steps 410 and 420, the network device on the network side sends a plurality of synchronization signal blocks to the terminal device. And each synchronization signal block will carry its own synchronization signal block identification. The terminal device can obtain each synchronization signal block identification by receiving and decoding each synchronization signal block through the synchronization signal block identification indication method stipulated in the communication protocol, that is, determine each synchronization signal block. Of course, those skilled in the art can understand that the implementations corresponding to step 410 and step 420 are only one of the multiple implementations defined in step 400. In the embodiment of the present disclosure, the implementations corresponding to step 410 and step 420 are only used for illustration, rather than limiting the scope of the embodiment of the present disclosure.

A step 410, in which the network device sends the plurality of synchronization signal blocks to the terminal device.

Alternatively, the network device nay include one or more network devices, for example, the network device where one or more cells are located, including the network device where a serving cell of the terminal device is located and the network device where a neighboring cell is located; for another example, the network devices where one or more Transmission Reception Points (TRP) are located, and a plurality of TRPs may belong to a serving cell or a neighboring cell of the terminal device.

It can be understood that the plurality of synchronization signal blocks come from different TRPs of different cells; or, come from different TRPs of the same cell; or, come from the same TRP of the same cell.

Figure 5:
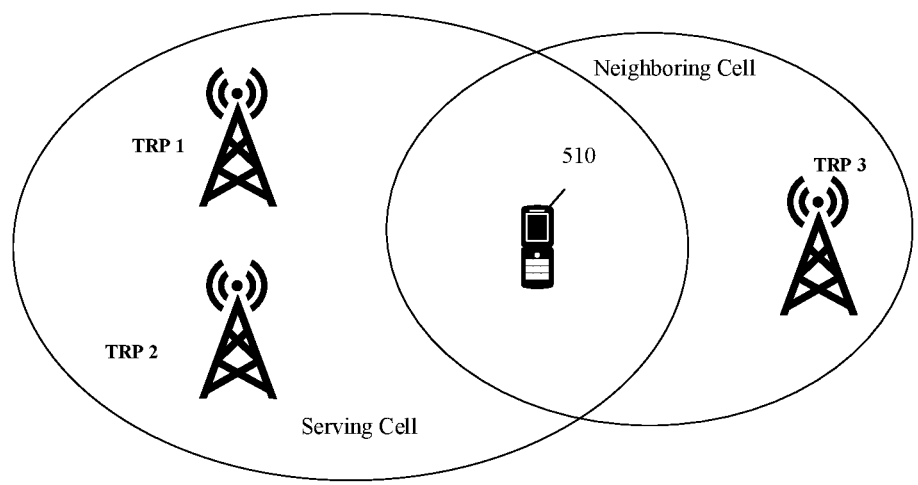
FIG. 5 is a schematic diagram of multi-TRP communication provided by an embodiment of the present disclosure.

With reference to FIG. 5, the terminal device 510 is located in a serving cell and also in a neighboring cell. Each cell may be covered by more than one TRP. As shown in FIG. 5, the serving cell is jointly covered by TRP 1 and TRP 2, thereby increasing the coverage radius of the serving cell. And the neighboring cell is covered by TRP 3.

Assuming that the network device sends two synchronization signal blocks to the terminal device, the two synchronization signal blocks may both come from TRP 3 (that is, the same TRP in the same cell); may come from TRP 1 and TRP 2 (that is, different TRPs in the same cell); may come from TRP 1 and TRP 3 (that is, different TRPs of different cells).

A step 420, in which the terminal device receives the plurality of synchronization signal blocks.

In the fifth generation mobile communication (5G) system, 5G Radio Resource Control (RRC) supports three states, which respectively are RRC IDLE state (that is, idle state), RRC_INACTIVE state (that is, inactive state) and RRC_CONNECTED state (connected state). With the evolution of subsequent technologies, other states may be added; and the aforementioned states may be renamed. However, these changes do not affect the implementability and integrity of the technical solutions of the embodiments of the present disclosure; and the changes of these names should also be considered within the protection scope of the embodiments of the present disclosure.

In a possible implementation, when the terminal device receives synchronization signal blocks, the terminal device is in an idle state. In another possible implementation, when the terminal device receives synchronization signal blocks, the terminal device is in an inactive state. In another possible implementation, the terminal device is in a connected state, but a beam failure (beam failure) or a Radio Link Failure (RLF) occurs.

It can be understood that, for synchronization signal blocks from different cells, the terminal device may distinguish them according to Physical Cell ID (PCI).

A step 430, in which the terminal device divides the plurality of synchronization signal blocks into M synchronization signal block groups.

M is a positive integer. M is the number of groups, into which the synchronization signal blocks of the same PCI are grouped. That is, the terminal device divides the plurality of synchronization signal blocks into the M synchronization signal block groups according to the plurality of synchronization signal blocks having the same PCI.

After receiving a plurality of synchronization signal blocks, the terminal device groups the plurality of synchronization signal blocks in the case where the plurality of synchronization signal blocks come from the same cell, and divides the plurality of synchronization signal blocks into one synchronization signal block group (that is, M is equal to 1), or a plurality of synchronization signal block groups (that is, M is greater than 1). The number of the synchronization signal blocks in each synchronization signal block group is the same or different. In the case where the plurality of synchronization signal blocks come from different cells, the terminal device first splits the synchronization signal blocks from different cells according to the PCI, and groups the synchronization signal blocks belonging to the same cell into the number M of groups. For example: if the synchronization signal blocks received by the terminal device comes from two cells (cell 1 and cell 2), then the terminal device first divides all the synchronization signal blocks into two parts according to the PCI, corresponding to cell 1 and cell 2 respectively, and then the synchronization signal blocks from cell 1 are divided into $M_1$ groups, and the synchronization signal blocks from cell 2 are divided into $M_2$ groups, $M_1$ and $M_2$ being the same or different. That is to say, the terminal device divides the plurality of synchronization signal blocks into $M_1$ plus $M_2$ groups.

In one possible implementation, the synchronization signal blocks belonging to the same synchronization signal block group come from the same TRP. In another possible implementation, the synchronization signal blocks belonging to the same synchronization signal block group may come from the same TRP, or may also come from different TRPs. In one possible implementation, the synchronization signal blocks from the same TRP are grouped into one group. In another possible implementation, the synchronization signal blocks from the same TRP are divided into two or more groups.

A step 440, in which the terminal device sends, for each of the synchronization signal block groups, random access preambles corresponding to N synchronization signal blocks on random access resources corresponding to the N synchronization signal blocks belonging to the same synchronization signal block group.

For any one synchronization signal block group in the M synchronization signal block groups, the terminal device sends, on the random access resources corresponding to the N synchronization signal blocks in this synchronization signal block group, the random access preambles corresponding to the N synchronization signal blocks, N being a positive integer.

It can be understood that, in all embodiments of the present disclosure, the values of N corresponding to the M synchronization signal block groups respectively may be the same or may also be different; or the value of N in the case of grouping a plurality of synchronization signal blocks of the serving cell and sending a random access preamble and the value of N in the case of grouping a plurality of synchronization signal blocks of the neighboring cell and sending a random access preamble may be the same or may also be different. That is, the numbers of the synchronization signal blocks contained in the M synchronization signal block groups may all be the same, or may all be different. It may also be that the numbers of synchronization signal blocks contained in a part of synchronization signal block groups are the same and the numbers of synchronization signal blocks contained in another part of synchronization signal block groups are different; that is, N=(N1, N2, . . . NM), in which M is the corresponding synchronization signal block groups. The embodiments of the present disclosure do not limit this.

The random access resource is a resource used for the purpose of positioning, and the resource may be at least one of the following: a time domain resource, a frequency domain resource, a code domain resource, a time domain resource and a frequency domain resource. Alternatively, at least one of time domain resources, frequency domain resources, and code domain resources corresponding to the N synchronization signal blocks is different. The code domain resource contains a random access preamble.

In an embodiment of the present disclosure, the N synchronization signal blocks may correspond to the number N of random access resources one by one, it may also be that one of the synchronization signal blocks corresponds to two or more random access resources, and it may also be that two or more synchronization signal blocks correspond to one random access resource.

The random access preamble is used for positioning. Alternatively, the random access preamble is used for the network device to perform positioning measurement on the terminal device to determine the geographic location of the terminal device.

In an embodiment of the present disclosure, the N synchronization signal blocks may correspond to the number N of random access preambles one by one, it may also be that one of the synchronization signal blocks corresponds to two or more random access preambles, and it may also be that two or more synchronization signal blocks correspond to one random access preamble.

Alternatively, the terminal device expects that the N synchronization signal blocks belonging to the same synchronization signal block group come from the same TRP. Through the value of N, the terminal device can control the number of synchronization signal blocks corresponding to the random access preamble sent for one TRP, so as to avoid a plurality of random access preambles involved in positioning measurement from being sent to one TRP.

A step 450, in which the network device receives, for each of the synchronization signal block groups, random access preambles corresponding to a N synchronization signal blocks on random access time-frequency resources corresponding to the N synchronization signal blocks belonging to the same synchronization signal block group.

For any one synchronization signal block group in the M synchronization signal block groups, the network device receives, on the random access resources corresponding to the N synchronization signal blocks in this synchronization signal block group, the random access preambles corresponding to the N synchronization signal blocks, N being a positive integer.

Alternatively, after receiving the random access preamble, the network device will measure the random access preamble to obtain a measurement result, and locate the terminal device according to the measurement result. The measurement result includes, but is not limited to: at least one of angle measurement value, time measurement value and signal strength measurement value.

The time measurement value includes, but is not limited to: at least one of the Reference Signal Time Difference (RSTD), receiving and transmitting time difference (Rx–Tx time difference); the signal strength measurement value includes, but is not limited to: at least one of Reference Signal Receiving Power (RSRP), Reference Signal Received Quality (RSRQ), Received Signal Strength Indicator (RSSI); the angle measurement value includes, but is not limited to: at least one of an Angle of Departure (AoD) and an Angle of Arrival (AoA).

To sum up, in the method provided by the present embodiment, the network device sends a plurality of synchronization signal blocks to the terminal device, so that the terminal device after grouping the plurality of synchronization signal blocks, can send the random access preambles corresponding to the N synchronization signal blocks on the random access resources corresponding to the N synchronization signal blocks in each of the synchronization signal block groups, and then the network device can perform positioning measurement according to the random access preambles. By using the random access resources, a method for the terminal device to also be able to perform positioning during random access is provided.

At the same time, in the method provided by the present embodiment, by grouping a plurality of synchronization signal blocks, the random access preambles will be sent only for the N synchronization signal blocks in each synchronization signal block group, avoiding sending too many random access preambles for the same one TRP, which leads to the problem of excessive power consumption of the terminal device.

An embodiment of the present disclosure proposes a method for grouping a plurality of synchronization signal blocks. In all the embodiments of the present disclosure, the method for grouping a plurality of synchronization signal blocks may be used in combination with any embodiment of the present disclosure, or may be used individually, which is not limited by the embodiments of the present disclosure. However, in order to make the technical solutions easier to understand, the following embodiments of the present disclosure will be described in combination with the foregoing embodiments, that is, an exemplary description will be made through a method of obtaining the M synchronization signal block groups.

Figure 6:
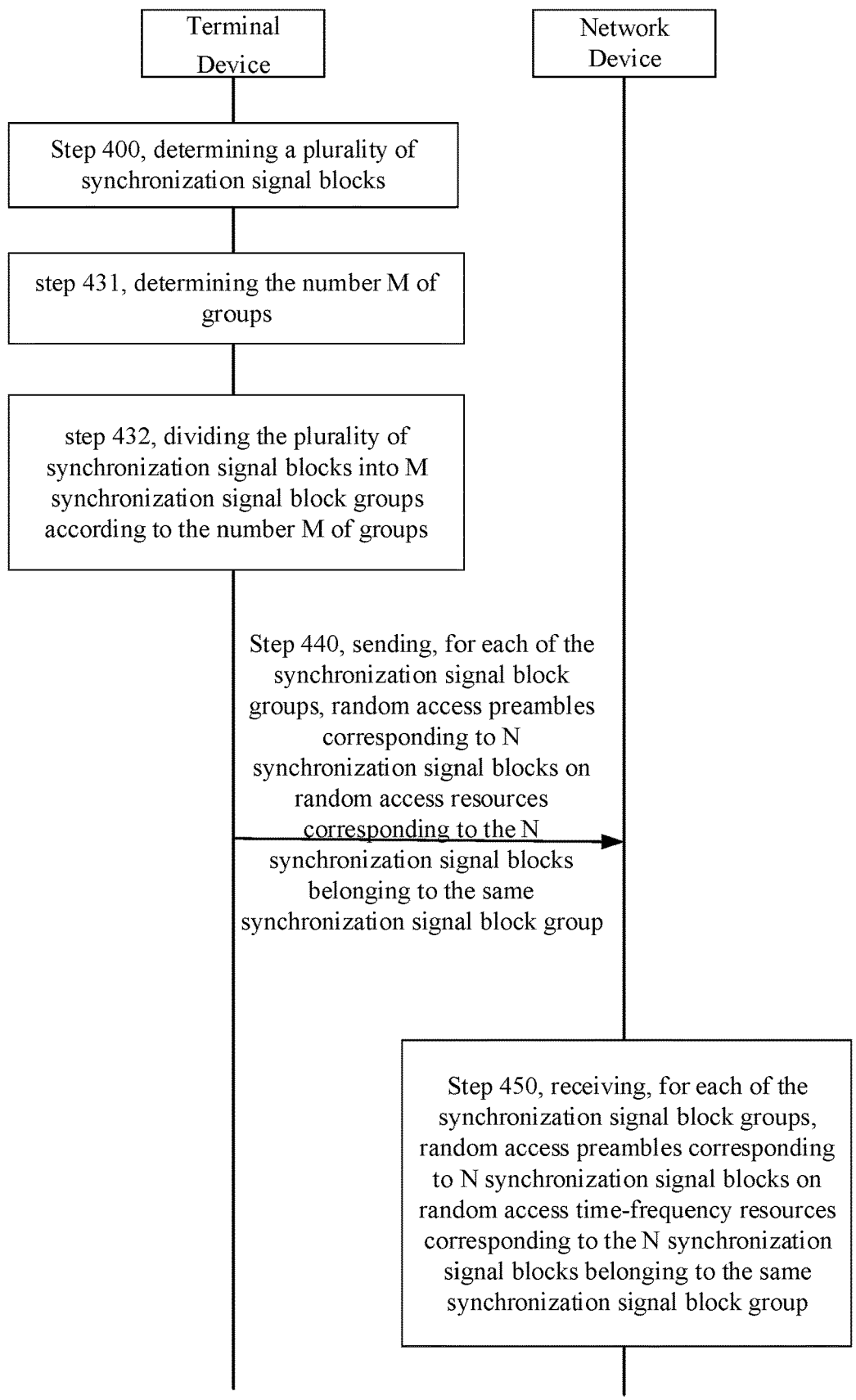
FIG. 6 is a flowchart of a positioning method provided by an embodiment of the present disclosure.

In an embodiment based on FIG. 4, FIG. 6 shows a flowchart of a positioning method provided by an embodiment of the present disclosure, which may be applied to the terminal device and the network device as shown in FIG. 3. In the present embodiment, step 430 can be replaced by step 431 or step 432. Of course, those skilled in the art can understand that when the following two technical solutions of the embodiments of the present disclosure are implemented independently, they constitute at least three completely independent embodiments: one embodiment includes step 400, step 431; another embodiment includes step 400, step 432; yet another embodiment includes step 400, step 431, step 432.

A step 400, in which the terminal device determines a plurality of synchronization signal blocks.

A step 431, in which the terminal device determines the number M of groups.

Before performing grouping, the terminal device needs to determine the number M of groups. Alternatively, the terminal device determines the number M of groups by using one of the following two implementations. Those skilled in the art can understand that, in all the embodiments of the present disclosure, the following two implementations (i.e., implementation 1 and implementation 2) can be used in combination with any embodiment of the present disclosure, or may be used individually, which is not limited in the embodiments of the present disclosure. However, in order to make the technical solutions easier to understand, the following embodiments of the present disclosure will be described in combination with the foregoing embodiments to illustrate how to determine the number M of groups in the embodiments of the present disclosure. Of course, this is just an illustration; those skilled in the art can understand that the following two implementations (i.e. implementation 1 and implementation 2) can be performed independently without step 400 or step 410 or step 420 or step 432 to form two completely independent technical solutions; the embodiments of the present disclosure do not limit this. That is, the following two implementations may be implemented independently, or may be implemented in combination with any of the previous steps.

Implementation 1: the terminal device determines the number of TRPs included in the network device as the number M of groups.

The terminal device needs to obtain the number of TRPs included in the network device, and determine the number of TRPs included in the network device as the number M of groups. It can be understood that, in all the embodiments of the present disclosure, each group of the number M of groups corresponds to one different TRP, respectively. In some alternative embodiments, at least one of the number M of groups corresponds to two or more TRPs, or at least one of the number M of groups corresponds to one set of TRPs. The embodiments of the present disclosure do not limit this.

Alternatively, the terminal device receives first indication information from a Location Management Function (LMF) network element, and determines the number of TRPs included in the network device according to the first indication information.

That is to say, the number of TRPs included in the network device can be configured by the LMF network element to the terminal device.

Alternatively, the terminal device receives second indication information from a serving cell, and determines the number of TRPs included in the network device according to the second indication information.

That is to say, the number of TRPs included in the network device can be configured by the network device to the terminal device. Specifically, the second indication information may be any of the following information:

I. Broadcasting Information.

Exemplarily, the number of TRPs included in the network device is included in a Master Information Block (MIB) sent by a Physical Broadcast Channel (PBCH), and broadcast by the network device to the terminal device.

II. System Information.

The system information includes Remaining Minimum System Information (RMSI) (i.e., SIB1) and Other System Information. Other System Information includes any type of the system information except SIB1, such as SIB2, SIB3, SIB4 . . . .

III. Positioning Reference Signal Configuration Information.

Exemplarily, the terminal device has received a Positioning Reference Signal (PRS) sent by the serving cell, the PRS configuration information is configured with a TRP ID for sending the PRS, or the PRS carries the TRP ID for sending this PRS. This PRS may be received by the terminal device in the connected state or the unconnected state (including RRC_IDLE state and RRC_INACTIVE state). Therefore, the terminal device can determine the number of TRPs contained in the network device according to different TRP IDs.

Iv. Signaling that has been Transmitted by the Serving Cell when the Terminal Device is in the Connected State.

Exemplarily, when this terminal is in the connected state, the network device uses RRC signaling to inform the terminal device of the number of TRPs contained in the network device.

It should be noted that the number of TRPs included in the network device here mainly refers to the number of TRPs included in the network device belonging to the same cell. Because if they are different cells, the TRPs belonging to different cells can be distinguished according to the Physical Cell ID (PCI). And the terminal first groups the plurality of received synchronization signal blocks according to the PCI, and then divides the plurality of synchronization signal blocks with the same PCI into the M synchronization signal block groups. However, how to distinguish TRPs that belong to the same cell, that is, have the same PCI, or determining the number of TRPs belonging to the same cell, can follow the above four methods.

Implementation 2: the terminal device determines the number M of groups according to a first correspondence; the first correspondence includes a correspondence between the number M of groups and a first maximum number of synchronization signal blocks that the network device supports to send. It can be understood that, in all the embodiments of the present disclosure, each group of the number M of groups corresponds to one different TRP, respectively. In some alternative embodiments, at least one of the number M of groups corresponds to two or more TRPs, or at least one of the number M of groups corresponds to one set of TRPs. The embodiments of the present disclosure do not limit this.

The terminal device can determine the number M of groups according to a default rule, for example, the first correspondence. Alternatively, the first correspondence is preconfigured in the protocol and stored in the chip of the terminal device.

The first maximum number is the possible maximum number of synchronization signal blocks that the network device supports to send. Under different carrier frequencies, the maximum number of synchronization signal blocks that the network device supports to send is different. For example: the maximum number of synchronization signal blocks that can be sent by the network device within 5 ms is 4 (when the carrier frequency is below 3 GHz) or 8 (when the carrier frequency is 3 GHz-6 GHz) or 64 (when the carrier frequency is above 6 GHz). Alternatively, the first maximum number includes, but is not limited to: 4, 8, 64.

The first correspondence may be a one-to-one correspondence, that is, one type of first maximum number corresponds to one number M of groups. The first correspondence may also not be a one-to-one correspondence, that is, one type of first maximum number corresponds to one or more numbers M of groups. Exemplarily, referring to the following table 1:

TABLE I

| First Maximum Number | Number M of Groups |
|---|---|
| 4 | 2 |
| 8 | 2 or 4 |
| 64 | 2 or 4 or 8 |

In the Table I, one type of first maximum number may correspond to one number M of groups, for example: when the first maximum number is 4, the number M of groups is 2. One type of first maximum number may also correspond to one or more numbers M of groups, for example: when the first maximum number is 8, the number M of groups is 2 or 4.

In the case where the first correspondence is a one-to-one correspondence, after determining the first maximum number of synchronization signal blocks that the network device supports to send, the terminal device can directly determine the number M of groups according to the first correspondence.

In the case where the first correspondence is not a one-to-one correspondence, that is: in the case where the first maximum number corresponds to at least two numbers M of groups, the terminal device can, according to any of the following methods, determine the target number of groups from the at least two numbers M of groups:

I. The terminal device determines the target number of groups from the at least two numbers M of groups according to the carrier frequency, at which the synchronization signal block is located.

Alternatively, the carrier frequency, at which the synchronization signal block is located is positively correlated with the number M of groups. That is, the higher the carrier frequency, at which the synchronization signal block is located, is, the larger the number M of groups is.

II. The terminal device determines the target number of groups from the at least two numbers M of groups according to third indication information from the serving cell.

Exemplarily, the third indication information is RMSI, i.e., SIB1 or other system information or RRC signaling. For example: when the first maximum number is 8, in the case where the number M of groups is 2 or 4, the terminal device can, according to indication of the 1-bit indicator in the RMSI, that is, SIB1, or other system information or RRC signaling, determine the target number of groups out of 2 and 4.

Exemplarily, the third indication information is positioning reference signal configuration information. The positioning reference signal configuration information is configured with the TRP ID that sends the positioning reference signal. The terminal device can determine the number of TRPs contained in the network device according to different TRP IDs. According to the number of TRPs included in the network device, the terminal device may determine, out of least two numbers M of groups, the number M of groups, which is slightly larger than the number of TRPs included in the network device, as the target number of groups. For example: when the first maximum number is 8, in the case where the number M of groups is 2 or 4, the terminal device determines that the number of TRPs contained in the network device is 3, then the terminal device determines 4 as the target number of groups.

III. The terminal device determines the target number of groups from the at least two numbers M of groups according to fourth indication information from the LMF network element.

Exemplarily, the fourth indication information may be a positioning protocol, including, but is not limited to, Long Term Evolution Positioning Protocol (LTE Positioning Protocol, LPP) information and New Radio Positioning Protocol (NR Positioning Protocol); or may also be a positioning protocol in any generation of communication technology in the future. For example: when the first maximum number is 8, in the case where the number M of groups is 2 or 4, the terminal device can, according to indication of the 1-bit indicator in the positioning protocol information, determine the target number of groups out of 2 and 4.

A step 432, in which the terminal device divides the plurality of synchronization signal blocks into the M synchronization signal block groups according to the number M of groups.

After the terminal device determines the number M of groups, the plurality of synchronization signal blocks can be divided into the M synchronization signal block groups.

Alternatively, the terminal device divides the plurality of synchronization signal blocks into the M synchronization signal block groups in the following manner:

determining a second maximum number of synchronization signal blocks that the network device supports to send; determining a second correspondence between numbers of the second maximum number of synchronization signal blocks and the M synchronization signal block groups; determining the numbers of the received plurality of synchronization signal blocks; dividing the plurality of synchronization signal blocks into the M synchronization signal block groups according to the second correspondence.

In the second correspondence, the numbers of the synchronization signal blocks correspond to the synchronization signal block groups one-to-one. Alternatively, the second correspondence is preconfigured in the protocol and stored in the chip of the terminal device, or the second correspondence is configured by the network device, or the second correspondence is configured by the LMF network element.

Exemplarily, the second maximum number is 4, and M is 2. The synchronization signal blocks that the network device supports to send include: SSB #0, SSB #1, SSB #2, and SSB #3. The terminal device may acquire the second correspondence between the above four synchronization signal blocks and the two synchronization signal block groups.

In one possible second correspondence, the numbers of the synchronization signal blocks belonging to the same synchronization signal block group are continuous. Referring to Table II below:

TABLE II

| Synchronization Signal Block Group | Synchronization Signal Block |
|---|---|
| First Synchronization Signal Block Group | SSB#0, SSB#1 |
| Second Synchronization Signal Block Group | SSB#2, SSB#3 |

Each synchronization signal block group includes a plurality of synchronization signal blocks with consecutive numbers, for example, the first synchronization signal block group includes SSB #0, SSB #1; the second synchronization signal block group includes SSB #2, SSB #3.

In another possible second correspondence, the numbers of the synchronization signal blocks belonging to the same synchronization signal block group are not continuous. Referring to Table III below:

TABLE III

| Synchronization Signal Block Group | Synchronization Signal Block |
| --- | --- |
| First Synchronization Signal Block Group | SSB#0, SSB#2 |
| Second Synchronization Signal Block Group | SSB#1, SSB#3 |

Each synchronization signal block group includes a plurality of synchronization signal blocks with discontinuous numbers, for example, the first synchronization signal block group includes SSB #0, SSB #2; the second synchronization signal block group includes SSB #1, SB #3.

In fact, the terminal device only receives 3 synchronization signal blocks: SSB #1, SSB #2, SSB #3. Then, the terminal device may group the synchronization signal blocks received by itself according to the determined second correspondence. For example: in the second correspondence shown in Table II, the terminal device divides SSB #1 into the first synchronization signal block group, and divides SSB #2 and SSB #3 into the second synchronization signal block group; in the second correspondence shown in Table III, the terminal device divides SSB #2 into the first synchronization signal block group, and divides SSB #1 and SSB #3 into the second synchronization signal block group.

A step 440, in which the terminal device sends, for each of the synchronization signal block groups, random access preambles corresponding to N synchronization signal blocks on random access resources corresponding to the N synchronization signal blocks belonging to the same synchronization signal block group.

Alternatively, when the terminal device needs to send a random access preamble, and how to choose this random access preamble, and on which random access time-domain resource and random access frequency-domain resource (that is, RO) this random access preamble is sent is determined according to this synchronization signal block received by the terminal device and the synchronization signal blocks that the network device actually transmits and the position sets of the RO. Specifically, please refer to the above description of the procedure.

Alternatively, the RSRPs of the N synchronization signal blocks are all greater than the RSRP threshold.

The terminal device measures the RSRP of the synchronization signal block. The RSRP is an average value of signal powers received on all Resource Elements (REs) of the reference signals carried within a certain symbol.

The RSRP threshold is a threshold for positioning purposes. The above RSRP threshold is independent of the threshold used for random access or for candidate beam determination, that is, the above RSRP threshold may be the same as or may also be different from the other two thresholds.

A step 450, in which the network device receives, for each of the synchronization signal block groups, random access preambles corresponding to N synchronization signal blocks on random access time-frequency resources corresponding to the N synchronization signal blocks belonging to the same synchronization signal block group.

To sum up, in the method provided by the present embodiment, the terminal device may determine the number of groups according to the number of TRPs contained in the network device, may also determine the number of groups according to a first correspondence between the number M of groups and the first maximum number of synchronization signal blocks that the network device supports to send, and divides the plurality of received synchronization signal blocks into the M synchronization signal block groups, so that all the N synchronization signal blocks in each synchronization signal block group come from the same TRP, so as to avoid sending too many random access preambles for the same TRP.

In the following, the N synchronization signal blocks actually used by the terminal device for positioning will be exemplarily described.

In an embodiment based on FIG. 4, the value of N is preconfigured; or the value of N is configured according to configuration information, and the configuration information comes from the network device or the LMF network element.

The configuration information may be system information from the network device, including Remaining Minimum System Information (RMSI) (i.e. SIB1) and Other System Information. Other System Information includes any type of system information except SIB1, such as SIB2, SIB3, SIB4 . . . .

It can be understood that N is a maximum value configured. In the case where the number of synchronization signal blocks in a certain synchronization signal block group is less than N, the number of synchronization signal blocks corresponding to the random access preamble actually transmitted by the terminal device is less than N.

Alternatively, for different synchronization signal block groups, the values of N are independent; or for different synchronization signal block groups, the values of N are the same; or for at least two synchronization signal block groups, the values of N are the same.

Exemplarily, for the M synchronization signal block groups, N of each synchronization signal block group is 1.

When N is 1, which indicates that for one TRP, a random access preamble is sent only for one synchronization signal block at most, then the respective TRPs perform positioning measurement according to one random access preamble received respectively, and finally according to the first number of TRP Calculate the location of the terminal based on the positioning measurement results of the first number of TRPs, and finally the position of the terminal is calculated according to the positioning measurement results of the first number of TRPs and the positions of the first number of TRPs.

Exemplarily, there are two synchronization signal block groups in the M synchronization signal block groups, and the values of N are the same, which is 2.

When N is 2, sending beams and/or receiving beams of the two synchronization signal blocks are different. It indicates that for one TRP, a random access preamble may be sent for one synchronization signal block at most, then the respective TRPs perform positioning measurement according to one random access preamble received respectively, and finally according to the first number of TRP Calculate the location of the terminal based on the positioning measurement results of the first number of TRPs, and finally the position of the terminal is calculated according to the positioning measurement results of the second number of TRPs and the positions of the second number of TRPs.

The second number of TRPs when N is 2 is less than or equal to the first number of TRPs when N is 1.

To sum up, in the method provided by the present embodiment, the values of N can be configured in different ways, such as: pre-configuration, configuration by a network device, and configuration by a LMF network element, which improves the flexibility of the positioning method.

It should be noted that the above method embodiments may be implemented individually or in combination, which is not limited in the present disclosure.

In the foregoing respective embodiments, the steps performed by the terminal device may be independently implemented as a positioning method on the terminal device side, and the steps performed by the network device may be independently implemented as a positioning method on the network device side.

Figure 7:
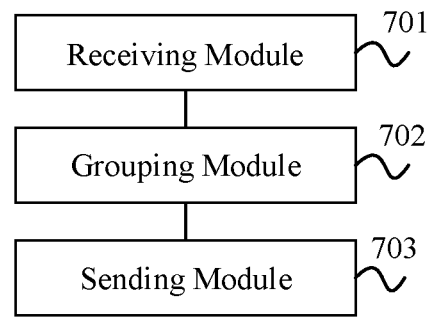
FIG. 7 is a block diagram of a positioning apparatus provided by an embodiment of the present disclosure.

FIG. 7 shows a structural block diagram of a positioning apparatus provided by an embodiment of the present disclosure. The apparatus may be implemented as a terminal device, or may be implemented as a part of the terminal device. The apparatus comprises a receiving module 701, a grouping module 702 and a sending module 703;

the receiving module 701 is configured to receive a plurality of synchronization signal blocks sent by a network device;

the grouping module 702 is configured to divide the plurality of synchronization signal blocks into M synchronization signal block groups, where M is a positive integer;

the sending module 703 is configured to send, for each of the synchronization signal block groups, random access preambles corresponding to N synchronization signal blocks on random access resources corresponding to the N synchronization signal blocks belonging to the same synchronization signal block group, the random access preambles being used for positioning, and the N being a positive integer.

In one embodiment, the grouping module 702 is configured to determine the number M of groups; and divide the plurality of synchronization signal blocks into the M synchronization signal block groups according to the number M of groups.

In one embodiment, the grouping module 702 is configured to determine the number of TRPs included in the network device as the number M of groups.

In one embodiment, the receiving module 701 is configured to receive first indication information from a LMF network element, and determine the number of TRPs included in the network device according to the first indication information; or the receiving module 701 is configured to receive second indication information from a serving cell, and determine the number of TRPs included in the network device according to the second indication information.

In one embodiment, the second indication information includes: broadcasting information; or system information; or positioning reference signal configuration information; or signaling that has been transmitted by the serving cell when the terminal device is in the connected state.

In one embodiment, the grouping module 702 is configured to determine the number M of groups according to a first correspondence; the first correspondence includes a correspondence between the number M of groups and a first maximum number of synchronization signal blocks that the network device supports to send.

In one embodiment, in the case where the first maximum number corresponds to at least two numbers M of groups, the grouping module 702 is configured to determine the target number of groups from the at least two numbers M of groups according to the carrier frequency, at which the synchronization signal block is located; or the grouping module 702 is configured to determine the target number of groups from the at least two numbers M of groups according to third indication information from the serving cell; or the grouping module 702 is configured to determine the target number of groups from the at least two numbers M of groups according to fourth indication information from the LMF network element.

In one embodiment, the grouping module 702 is configured to determine a second maximum number of synchronization signal blocks that the network device supports to send; the grouping module 702 is configured to determine a second correspondence between numbers of the second maximum number of synchronization signal blocks and the M synchronization signal block groups; the grouping module 702 is configured to determine numbers of the plurality of synchronization signal blocks received; the grouping module 702 is configured to divide the plurality of synchronization signal blocks into the M synchronization signal block groups according to the second correspondence; in the second correspondence, the numbers of the synchronization signal blocks correspond to the synchronization signal block groups one-to-one.

In one embodiment, in the second correspondence, the numbers of the synchronization signal blocks belonging to the same synchronization signal block group are continuous.

In one embodiment, in the second correspondence, the numbers of the synchronization signal blocks belonging to the same synchronization signal block group are not continuous.

In one embodiment, the RSRPs of the number N synchronization signal blocks are all greater than the RSRP threshold.

In one embodiment, for different synchronization signal block groups, the values of N are independent; or for different synchronization signal block groups, the values of N are the same; or for at least two synchronization signal block groups, the values of N are the same.

In one embodiment, the value of N is preconfigured; or the value of N is configured according to configuration information, the configuration information coming from the serving cell or the LMF network element.

Figure 8:
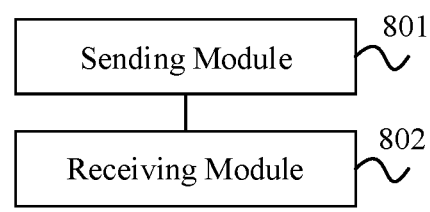
FIG. 8 is a block diagram of a positioning apparatus provided by an embodiment of the present disclosure.

FIG. 8 shows a structural block diagram of a positioning apparatus provided by an embodiment of the present disclosure. The apparatus may be implemented as a network device, or may be implemented as a part of the network device. The apparatus comprises a sending module 801 and a receiving module 802;

the sending module 801 is configured to send a plurality of synchronization signal blocks to a terminal device, the plurality of synchronization signal blocks being divided into M synchronization signal block groups by the terminal device, where M is a positive integer;

the receiving module 802 is configured to receive, for each of the synchronization signal block groups, random access preambles corresponding to N synchronization signal blocks on random access resources corresponding to the N synchronization signal blocks belonging to the same synchronization signal block group, the random access preambles being used for positioning, and the N being a positive integer.

In one embodiment, the number M of groups is the number of Transmission Reception Points TRPs included in the network device.

In one embodiment, the sending module 801 is configured to send second indication information, which is used to indicate the number of TRPs included in the network device.

In one embodiment, the second indication information includes: broadcasting information; or system information; or positioning reference signal configuration information; or signaling that has been transmitted when the terminal device is in the connected state.

In one embodiment, the number M of groups is determined by the terminal device according to a first correspondence; in which the first correspondence includes a correspondence between the number M of groups and a first maximum number of synchronization signal blocks that the network device supports to send.

In one embodiment, in the case where the first maximum number corresponds to at least two numbers M of groups, the sending module 801 is configured to send third indication information, which is used for the terminal device to determine the target number of groups from the at least two numbers M of groups.

In one embodiment, the RSRPs of the N synchronization signal blocks are all greater than the RSRP threshold.

In one embodiment, for different synchronization signal block groups, the values of N are independent; or for different synchronization signal block groups, the values of N are the same; or for at least two synchronization signal block groups, the values of N are the same.

In one embodiment, the value of N is preconfigured; or the value of N is configured according to configuration information, the configuration information coming from the network device or the Location Management Function LMF network element.

Figure 9:
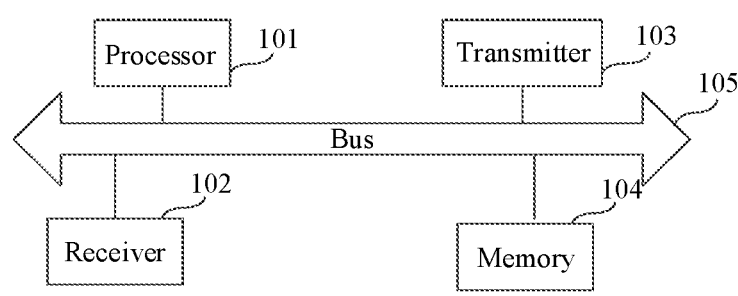
FIG. 9 is a block diagram of a communication device provided by an embodiment of the present disclosure.

FIG. 9 shows a schematic structural diagram of a communication device (a terminal device or a network device) provided by an embodiment of the present disclosure. The communication device includes: a processor 101, a receiver 102, a transmitter 103, a memory 104 and a bus 105.

The processor 101 includes one or more processing cores, and the processor 101 executes various functional applications and information processing by running software programs and modules.

The receiver 102 and the transmitter 103 may be realized as one communication component, and the communication component can be one communication chip.

The memory 104 is connected to the processor 101 through the bus 105.

The memory 104 may be configured to store at least one instruction, and the processor 101 is configured to execute the at least one instruction, so as to implement various steps in the foregoing method embodiments.

In addition, the memory 104 may be implemented by any type of volatile or non-volatile storage devices or a combination thereof. And the volatile or non-volatile storage devices include, but are not limited to: magnetic or optical disks, Electrically Erasable Programmable Read Only Memory (EEPROM), Erasable Programmable Read Only Memory (EEPROM), Erasable Programmable Read Only Memory, EPROM), Static Random Access Memory (SRAM), Read-Only Memory (ROM), magnetic memory, flash memory, Programmable Read-Only Memory (PROM).

In an embodiment, there is further provided a computer-readable storage medium, in which at least one instruction, at least one segment of program, a code set, or an instruction set is stored, the at least one instruction, the at least one segment of program, the code set or the instruction set being loaded and executed by the processor to implement the positioning methods performed by the communication device, which are provided in the above respective method embodiments.

In an embodiment, there is further provided a computer program product or computer program, which includes computer instructions stored in a computer readable storage medium. The processor of the computer device reads the computer instruction from the computer-readable storage medium, and the processor executes the computer instruction, so that the computer device executes the positioning methods provided in the above aspects.

Those of ordinary skill in the art can understand that all or part of the steps of implementing the above embodiments may be completed by hardware, or may be completed by instructing related hardware through a program. The program may be stored in a computer-readable storage medium, and the storage medium mentioned above may be a read-only memory, a magnetic disk or an optical disk, and the like.

The above descriptions are only embodiments of the present disclosure, and are not intended to limit the present disclosure. Any modifications, equivalent replacements, improvements, etc. made within the spirit and principles of the present disclosure shall be included within the protection range of the present disclosure.

What is claimed is:

1. A positioning method, comprising:
receiving, by a terminal device, a plurality of synchronization signal blocks sent by a network device;
determining, by the terminal device, a number M of groups according to a first correspondence, wherein the first correspondence comprises a correspondence between the number M of groups and a first maximum number of synchronization signal blocks that the network device supports to send, wherein M is a positive integer;
dividing, by the terminal device, the plurality of synchronization signal blocks into M synchronization signal block groups according to the number M of groups; and
sending, by the terminal device and for each of the synchronization signal block groups, random access preambles corresponding to N synchronization signal blocks on random access resources corresponding to the N synchronization signal blocks belonging to a same synchronization signal block group, and N is a positive integer.

2. The method according to claim 1, wherein determining the number M of groups further comprises:
determining, by the terminal device, a number of Transmission Reception Points (TRPs) included in the network device as the number M of groups.

3. The method according to claim 2, further comprising one of following steps:
receiving, by the terminal device, first indication information from a Location Management Function (LMF) network element, and determining, by the terminal device, the number of TRPs included in the network device according to the first indication information; or
receiving, by the terminal device, second indication information from a serving cell, and determining, by the terminal device, the number of TRPs included in the network device according to the second indication information.

4. The method according to claim 3, wherein the second indication information comprises one of following information:
broadcasting information;
system information;
positioning reference signal configuration information; or
signaling that has been transmitted by the serving cell when the terminal device is in the connected state.

5. The method according to claim 1, wherein in response to the first maximum number corresponding to at least two numbers M of groups, the method further comprises at one of following steps:
determining the target number of groups from the at least two numbers M of groups according to a carrier frequency, at which the plurality of synchronization signal blocks are located;
determining the target number of groups from the at least two numbers M of groups according to third indication information from a serving cell; or
determining the target number of groups from the at least two numbers M of groups according to fourth indication information from a Location Management Function (LMF) network element.

6. The method according to claim 1, wherein the dividing the plurality of synchronization signal blocks into the M synchronization signal block groups according to the number M of groups comprises:
determining a second maximum number of synchronization signal blocks that the network device supports to send;
determining a second correspondence between numbers of the second maximum number of synchronization signal blocks and the M synchronization signal block groups;
determining numbers of the plurality of synchronization signal blocks received; and
dividing the plurality of synchronization signal blocks into the M synchronization signal block groups according to the second correspondence;
wherein in the second correspondence, the numbers of the synchronization signal blocks correspond to the synchronization signal block groups one-to-one.

7. The method according to claim 6, wherein:
in the second correspondence, the numbers of the synchronization signal blocks belonging to the same synchronization signal block group are continuous.

8. The method according to claim 6, wherein:
in the second correspondence, the numbers of the synchronization signal blocks belonging to the same synchronization signal block group are not continuous.

9. The method according to claim 1, wherein:
Reference Signal Receiving Powers (RSRPs) of the N synchronization signal blocks are all greater than a RSRP threshold.

10. The method according to claim 1, wherein values of N meet one of following conditions:
for different synchronization signal block groups, the values of N are independent;
for different synchronization signal block groups, the values of N are the same; or
for at least two synchronization signal block groups, the values of N are the same.

11. The method according to claim 1, wherein a value of N meet one of following conditions:
the value of N is preconfigured; or
the value of N is configured according to configuration information, wherein the configuration information is from a serving cell or a Location Management Function (LMF) network element.

12. A positioning method, comprising:
sending, by a network device, a plurality of synchronization signal blocks to a terminal device, wherein the plurality of synchronization signal blocks are divided by the terminal device into M synchronization signal block groups, wherein M is a positive integer; and
receiving, by the network device and for each of the M synchronization signal block groups, random access preambles corresponding to N synchronization signal blocks on random access resources corresponding to the N synchronization signal blocks belonging to a same synchronization signal block group and N is a positive integer;
wherein a number M of groups is determined by the terminal device according to a first correspondence, wherein the first correspondence comprises a correspondence between the number M of groups and a first maximum number of synchronization signal blocks that the network device supports to send.

13. The method according to claim 12, wherein a number M of groups is a number of Transmission Reception Points (TRPs) included in the network device, and the method further comprises:
sending, by the network device, second indication information, wherein the second indication information is configured to indicate the number of TRPs included in the network device,
wherein the second indication information comprises one of following information:
broadcasting information;
system information;
positioning reference signal configuration information; or
signaling that has been transmitted when the terminal device is in the connected state.

14. The method according to claim 12, wherein:
wherein in response to the first maximum number corresponding to at least two numbers M of groups, the method further comprises:
sending, by the network device, third indication information, wherein the third indication information is configured for the terminal device to determine a target number of groups from the at least two numbers M of groups.

15. A terminal device, comprising:
a processor;
a transceiver connected to the processor;
a memory for storing executable instructions of the processor;
wherein the processor is configured to load and execute the executable instructions to:
receive a plurality of synchronization signal blocks sent by a network device;
determine a number M of groups according to a first correspondence, wherein the first correspondence comprises a correspondence between the number M of groups and a first maximum number of synchronization signal blocks that the network device supports to send, wherein M is a positive integer;
divide the plurality of synchronization signal blocks into M synchronization signal block groups according to the number M of groups;

send, for each of the synchronization signal block groups, random access preambles corresponding to N synchronization signal blocks on random access resources corresponding to the N synchronization signal blocks belonging to a same synchronization signal block group, and N is a positive integer.

16. A network device, comprising:
a processor;
a transceiver connected to the processor;
a memory for storing executable instructions of the processor;
wherein the processor is configured to load and execute the executable instructions to implement the positioning method according to claim 12.

17. A non-transitory computer readable storage medium, wherein executable instructions are stored in the readable storage medium, and the executable instructions are loaded and executed by a processor to implement the positioning method according to claim 1.

18. A non-transitory computer readable storage medium, wherein executable instructions are stored in the readable storage medium, and the executable instructions are loaded and executed by a processor to implement the positioning method according to claim 12.

* * * * *